(12) United States Patent
Potter

(10) Patent No.: US 9,188,055 B2
(45) Date of Patent: Nov. 17, 2015

(54) SYSTEM AND METHOD TO CONTROL AUTOMOTIVE POWERTRAIN COMPONENT TEMPERATURE

(71) Applicant: Kenneth J Potter, Almont, MI (US)

(72) Inventor: Kenneth J Potter, Almont, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/571,923

(22) Filed: Dec. 16, 2014

(65) Prior Publication Data
US 2015/0096509 A1 Apr. 9, 2015

Related U.S. Application Data

(62) Division of application No. 13/329,393, filed on Dec. 19, 2011, now Pat. No. 8,919,299.

(51) Int. Cl.
F01P 11/08 (2006.01)
F16H 57/04 (2010.01)

(52) U.S. Cl.
CPC ............ F01P 11/08 (2013.01); F16H 57/0413 (2013.01); F16H 57/0475 (2013.01)

(58) Field of Classification Search
USPC ............. 123/41.33, 41.08, 41.09, 41.1, 41.31
See application file for complete search history.

(56) References Cited

U.S. PATENT DOCUMENTS

| 7,077,776 | B2 | 7/2006 | Sorab et al. |
| 7,299,994 | B2 | 11/2007 | Brown et al. |
| 8,181,610 | B2 * | 5/2012 | Dipaola et al. ............... 123/41.1 |
| 2002/0128107 | A1 | 9/2002 | Wakayama |
| 2006/0060346 | A1 | 3/2006 | Sasaki |

FOREIGN PATENT DOCUMENTS

| DE | 10237415 A1 | 3/2004 | |
| EP | 0736703 A1 | 10/1996 | |
| WO | 2008072775 A2 | 6/2008 | |
| WO | WO 2010137214 A2 * | 12/2010 | ............. G05D 23/02 |

OTHER PUBLICATIONS

International Search Report dated Mar. 6, 2013 for International Application No. PCT/US2012/068971, International Filing Date Dec. 11, 2012.
Written Opinion dated Mar. 6, 2013 for International Application No. PCT/US2012/068971, International Filing Date Dec. 11, 2012.

* cited by examiner

Primary Examiner — Hung Q Nguyen
(74) Attorney, Agent, or Firm — Ralph E. Smith

(57) ABSTRACT

A thermal management unit for a vehicle powertrain component. The thermal management unit is designed to maintain the operating temperature of the vehicle component within a relatively small, ideal temperature range. The thermal management unit includes a three-way valve and temperature sensor that uses the temperature of a lubricant used by the component itself to configure the valve such that lubricant having the desired temperature is passed to the component.

8 Claims, 2 Drawing Sheets

SYSTEM AND METHOD TO CONTROL AUTOMOTIVE POWERTRAIN COMPONENT TEMPERATURE

CROSS REFERENCE TO RELATED APPLICATIONS

This application is a divisional application of U.S. Ser. No. 13/329,393, filed Dec. 19, 2011.

FIELD

The present disclosure relates to automotive powertrains, specifically to a system for controlling the temperature of a powertrain component.

BACKGROUND

Certain automotive components need to be held within a certain temperature range to operate correctly. In a vehicle powertrain, for example, one of these components is the vehicle's transmission that is used to transfer torque from the vehicle's engine to its wheels. It is known that operating a transmission at too high of a temperature can cause excessive wear, seals to harden and clutch performance to degrade, which shortens the life of the transmission. It is also known that transmissions will not operate as consistently, reliably and efficiently if they are too cold. Typically, it is desired to have the transmission operating temperature to be about the same as the engine's temperature and somewhere in the range of 160° to 200° Fahrenheit. Operation at the ideal temperature promotes optimized shift quality through stable viscosity and friction properties of the transmission's fluid. Additionally, the lower, controlled viscosity of the fluid resulting from a narrow operating temperature reduces viscous drag, improving transmission overall efficiency.

In an automatic transmission, automatic transmission fluid (ATF) serves as a coolant for the transmission while also lubricating transmission components and acting as the hydraulic fluid. Transmission fluid reduces heat and friction, which helps sustain an automatic transmission's life. Manual transmissions use a transmission oil sometimes referred to as gear oil. Modern attempts to control transmission temperature include oil cooling devices to cool down the transmission oil/fluid. Bypass valves may be used to bypass the cooling device when the oil/ATF drops below a certain temperature. Temperature rise times and the temperature achieved, however, are dependent upon the self-generated heat of the transmission. This is not a desirable mechanism since the source of the heat are the inefficiencies of the transmission. Modern transmissions have high efficiencies and forcing inefficient operation to generate heat reduces the benefit of controlled temperature operation.

Accordingly, there is a need and desire for an improved method and system for controlling the temperature of a powertrain component such as a transmission.

SUMMARY

In one form, the present disclosure provides a thermal management unit for a vehicle powertrain component. The thermal management unit comprises a temperature controlled multi-port valve having a sensor adapted to sense a temperature of a lubricant used by the powertrain component, said valve having at least a first configuration during a first state whereby heated lubricant is passed to the powertrain component and a second configuration during a second state whereby cooled lubricant is passed to the powertrain component based on the sensed temperature; and means for heating and cooling the lubricant.

The present disclosure also provides an engine cooling system comprising a radiator, a pump adapted to input engine coolant from the radiator and to pump the coolant to an engine, and a thermal management unit for managing the temperature of a vehicle powertrain component. The thermal management unit comprises a temperature controlled multi-port valve having a sensor adapted to sense a temperature of a lubricant used by the powertrain component, said valve having at least a first configuration during a first state whereby heated lubricant is passed to the powertrain component and a second configuration during a second state whereby cooled lubricant is passed to the powertrain component based on the sensed temperature; and means for heating and cooling the lubricant.

In one form, the means for heating and cooling comprises a (coolant to oil) heat exchanger for heating the lubricant during the first state and cooling the lubricant during the second state. The heat exchanger has a first port for inputting the lubricant from the component and a second port for outputting the heated or cooled lubricant to the sensor, a third port connected to a first port of the valve and a fourth port connected to a coolant output of an engine. In another form, the means for heating and cooling comprises a discrete lubricant cooler adapted to input the lubricant, cool the lubricant, and output the cooled lubricant to a first port of the valve; and a heat exchanger adapted to input the lubricant and heated coolant from an engine via different ports, use the heated coolant to heat the lubricant, and output the heated lubricant to a second port of the valve. In this embodiment, control of the valve, based on temperature sensing of the lubricant, provides for full heating, full cooling, or a mixture of both to provide a fixed temperature of the lubricant returning to the component.

In one embodiment, the powertrain component is a transmission and the lubricant is transmission oil.

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
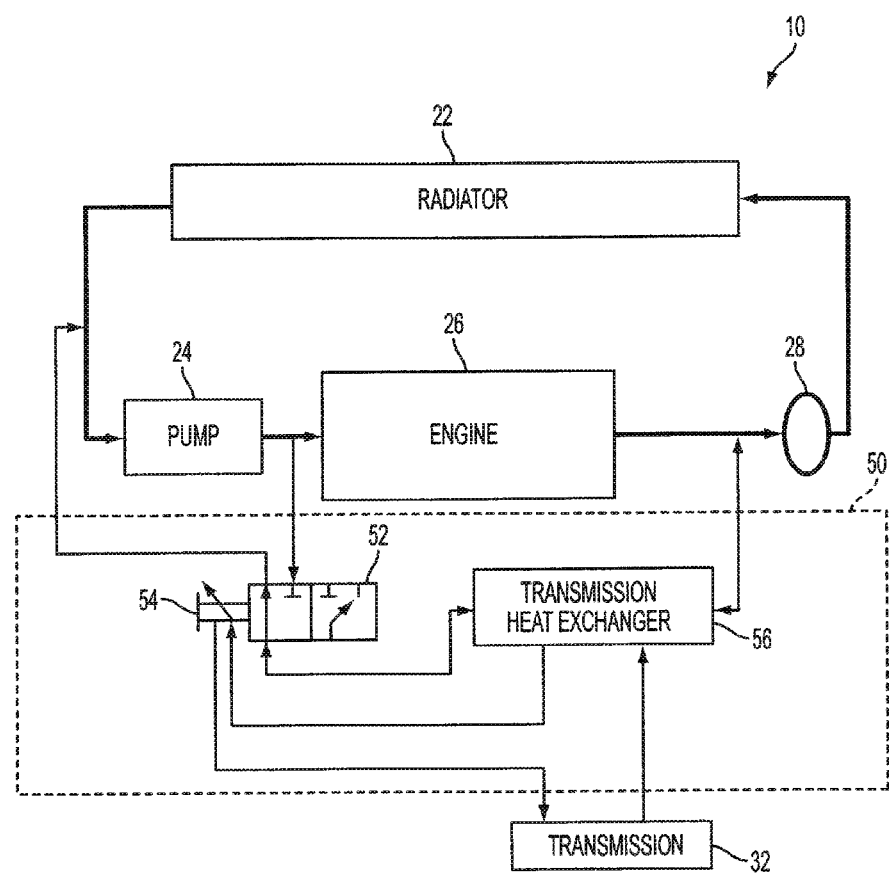
FIG. 1 is an illustration of a vehicle cooling system having a thermal management unit constructed in accordance with an embodiment disclosed herein.

FIG. 1 is an illustration of a vehicle cooling system 10 having a thermal management unit 50 constructed in accordance with an embodiment disclosed herein. As will be discussed below, the thermal management unit 50 is configured to control the temperature of a powertrain component such as a transmission 32 such that its operating temperature is maintained within a relatively small ideal temperature range.

The cooling system 10 comprises a radiator 22 connected to a pump 24 that pumps engine coolant through an engine 26. The coolant leaving the engine 26 is passed through a thermostat 28 before returning to the radiator 22. The radiator 22, pump 24, engine 26 and thermostat 28 have ports for accepting tubing suitable for maintaining the coolant during operation of the vehicle. The radiator 22, pump 24, engine 26 and thermostat 28 are connected as illustrated using the tubing and any necessary connectors, O-rings or other components needed to seal off the port-to-tube connections. Hereinafter, all port-to-tube connections or all tube-to-tube connections described herein will include connectors, seals and/or other components needed to maintain the fluid passing through the connection and the pressure existing therein.

The thermal management unit 50 includes a three-way control valve 52, temperature sensor 54 and a transmission heat exchanger 56. Although shown as a separate component, the sensor 54 is preferably integral with the control valve 52, taking the form of a temperature based actuator and forming a temperature controlled multi-port valve. Alternatively, the valve can be electrically operated by a solenoid. The sensor 54 is used to control the switching of the valves within the control valve 52 in the manner discussed below. In addition, the transmission heat exchanger 56 is configured to use coolant exiting the pump 24 or engine 26 to cool or heat transmission lubricant (i.e., automatic transmission fluid for an automatic transmission or gear oil for a manual transmission) used by the transmission 32 in accordance with the principles disclosed herein. The heat exchanger 56 uses heat transfer properties to alter the temperature of the lubricant based on the coolant temperature without the mixing of the fluids.

A first port of the control valve 52 is connected to the output of the pump 24 (or the tubing connected to the pump output) for inputting the coolant leaving the pump 24. A second port of the control valve 52 is connected to a first port of the transmission heat exchanger 56 for inputting coolant from or outputting coolant to the heat exchanger 56. A third port of the control valve 52 is connected to the output of the radiator 24 (and/or the tubing connected to the pump input).

A second port of the transmission heat exchanger 56 is connected to the output of the engine 26 (or the tubing connected to the engine output) for inputting heated coolant from the engine's 26 output or outputting coolant to the thermostat 28. A third port of the transmission heat exchanger 56 is connected to receive transmission lubricant from the transmission 32. A fourth port of the transmission heat exchanger 56 is connected to output heated/cooled transmission lubricant to the temperature sensor 54. The sensor 54 has a mechanism for looping back the lubricant to the transmission 32.

In operation, in a first, normal state of the system 10, the valve 52 is set to a first configuration that selects heated coolant from the output of the engine 26. Due to the lower pressure, coolant heated by the engine flows through the heat exchanger 56 and returns to the pump inlet (via the valve port connected to the pump inlet/radiator output tubing). Transmission lubricant flowing through the heat exchanger 56 is heated by the heated coolant from the output of the engine 26. This heated transmission lubricant flows to the sensor 54 and is looped back to the transmission 32. The sensor 54 maintains the valve's 52 configuration as long as the temperature of the transmission lubricant does not exceed a predetermined temperature. In a desired embodiment, the predetermined temperature is about 180° Fahrenheit. This routing of the engine coolant promotes the most rapid warming of the transmission. Tapping the coolant exiting from the engine before the thermostat 28 ensures heating flow throughout the drive cycle, but particularly immediately after cold start.

If the sensor 54 determines that the temperature of the transmission lubricant exceeds the predetermined temperature, the system enters the second, active state. In the second state, the valve 52 is switched to a second configuration to select the pressurized, lower temperature coolant flowing from the pump's 24 output. The relatively high restriction of the engine creates a lower pressure at the engine coolant output, allowing the flow to pass through the transmission heat exchanger 56 to mix with the coolant exiting the engine, passing through the thermostat 28 to the radiator 22 inlet. Transmission lubricant flowing through the heat exchanger 56 is cooled by the lower temperature coolant from the output of the pump 24. This cooled transmission lubricant flows to the sensor 54 and is looped back to the transmission 32. The sensor 54 maintains the valve's 52 configuration until the temperature of the transmission lubricant falls below the predetermined temperature at which point the valve configuration is switched back to the first configuration and the system enters the first state described above. This flow direction provides the heat exchanger 56 with the lowest possible coolant temperature, providing the maximum possible cooling of the transmission while maintaining a temperature compatible with efficient operation.

Figure 2:
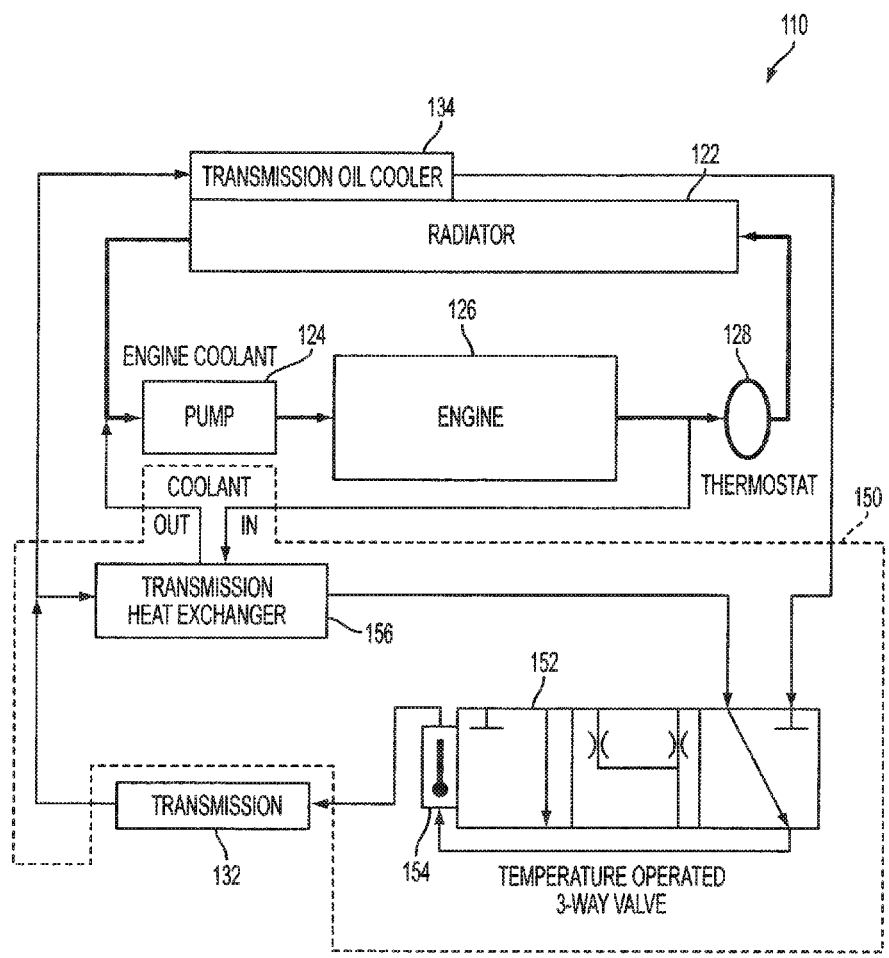
FIG. 2 is an illustration of another vehicle cooling system having a thermal management unit constructed in accordance with another embodiment disclosed herein.

FIG. 2 is an illustration of a vehicle cooling system 110 having a thermal management unit 150 constructed in accordance with another embodiment disclosed herein. As will be discussed below, the thermal management unit 150 is configured to control the temperature of a powertrain component such as a transmission 132 such that its operating temperature is maintained within a relatively small ideal temperature range.

The cooling system 110 comprises a radiator 122 connected to a pump 124 that pumps engine coolant through an engine 126. The coolant leaving the engine 126 is passed through a thermostat 128 before returning to the radiator 122. A transmission oil cooler 134 is also provided. The radiator 122, pump 124, engine 126 and thermostat 128 have ports for accepting tubing suitable for maintaining the coolant during operation of the vehicle. The radiator 122, pump 124, engine 126 and thermostat 128 are connected as illustrated using the tubing and any necessary connectors, O-rings or other components needed to seal off the port-to-tube connections. Likewise, the transmission oil cooler 134 will have ports for accepting tubing suitable for maintaining transmission lubricant during operation of the vehicle.

The thermal management unit 150 includes a three-way center open control valve 152, temperature sensor 154 and a transmission heat exchanger 156. Although shown as a separate component, the sensor 154 is preferably integral with the control valve 152, functioning as a temperature controlled actuator and forming a temperature controlled multi-port valve. In the illustrated embodiment, the transmission heat exchanger 156 is configured to use heated coolant exiting the engine 126 to heat the transmission lubricant while the transmission oil cooler 134 is designed to cool the transmission lubricant. The heat exchanger 156 uses heat transfer properties to alter the temperature of the lubricant based on the coolant temperature without the mixing of the fluids. The sensor 154 is used to control the switching of the valves within the control valve 152 to pass the heated, cooled or a fixed temperature mixture of the heated and cooled transmission lubricant to the transmission 132 in accordance with the principles disclosed herein.

In the illustrated embodiment, a first port of the transmission heat exchanger 156 is connected to the coolant output of the engine 126 (or the tubing connected to the engine output) for inputting heated coolant from the engine's 126 output. A second port of the transmission heat exchanger 156 is connected to the input of the pump 124 or other suitable low pressure point in the cooling circuit to output the coolant received from the engine 126 to the pump 124. A third port of the heat exchanger 156 inputs transmission lubricant from the transmission 132. A fourth port of the exchanger 156 is used to output heated transmission lubricant to a first port of the valve 152. In operation, the heated coolant will flow from the engine 126, through the heat exchanger 156, to the pump 124 and will heat the transmission lubricant input from the transmission 132. The heated lubricant will be output to the first port of the valve 152.

The transmission oil cooler 134 has a first port for inputting transmission lubricant from the transmission 132 and a second port for outputting cooled transmission lubricant to a second port of the valve 152. In operation, the transmission lubricant will flow from the transmission 132, through the cooler 134, and be output as cooled transmission lubricant. The cooled lubricant is output to the second port of the valve 152. A third port of the control valve 152 is used to output transmission lubricant to the sensor 154 and back to the transmission 132.

In operation, the valve 152 operates in a three-way center open mixing mode to keep the temperature of the transmission lubricant (and thus the transmission 132) within a small, desired operating range. In a desired embodiment, the minimum temperature will be about 175° Fahrenheit and the maximum temperature will be 185° Fahrenheit. Ideally, the temperature will be maintained at about 180° Fahrenheit.

In a first state of the system 110, the valve 152 is set to a first configuration that selects heated transmission lubricant from the output of the heat exchanger 156 and blocks output from the transmission cooler 134. Heated lubricant is required in this state to ensure that the lubricant and the transmission 132 are operated above a first predetermined temperature (i.e., the minimum temperature of the desired range). The heated lubricant flows through the third port of the valve 152, to the sensor 154 and to the input of the transmission 132. The transmission lubricant leaves the transmission 132 and enters both the heat exchanger 156 and transmission oil cooler 134. The sensor 154 maintains the valve's 152 configuration until the temperature of the transmission lubricant exceeds the first predetermined temperature.

If the sensor 154 determines that the temperature of the transmission lubricant exceeds a second predetermined temperature (i.e., the maximum temperature of the desired range), the system 110 enters a second state. In the second state, the valve 152 is switched to a second configuration to select the cooled transmission lubricant from the transmission oil cooler 134. The lower temperature lubricant flows through the third port of the valve 152, to the sensor 154 and to the input of the transmission 132. The transmission lubricant leaves the transmission 132 and enters both the heat exchanger 156 and transmission oil cooler 134. The sensor 154 will maintain the valve's 152 configuration until the temperature of the transmission lubricant falls below the second predetermined temperature.

If the sensor 154 determines that the temperature of the transmission lubricant exceeds the first, minimum predetermined temperature, but is below the second, maximum predetermined temperature, the system 110 enters a third state. In the third state, the valve 152 is switched to a third configuration to proportionally blend flows from the cooled transmission lubricant from the transmission oil cooler 134 and the heated transmission lubricant from the heat exchanger 156. Ideally, the mixture will result in the transmission lubricant achieving the desired 180° Fahrenheit temperature. The mixed temperature lubricant flows through the third port of the valve 152, to the sensor 154 and to the input of the transmission 132. The transmission lubricant leaves the transmission 132 and enters both the heat exchanger 156 and transmission oil cooler 134. The sensor 154 will maintain the valve's 152 configuration until the temperature of the transmission lubricant falls outside the range between the first and second predetermined temperatures.

Accordingly, the systems 10, 110 described herein use feedback from the transmission lubricant to ensure proper and direct control of the transmission 32, 132 temperature. The transmission's 32, 132 temperature is maintained within the desired range regardless of environmental or duty cycle conditions. The temperature control of the valves 52, 152 (via sensors 54, 154) could be mechanical such as wax motor control or electrical such as a solenoid. As shown above, the heat exchangers 56, 156 use engine coolant to exchange heat with the transmission lubricant based on the type of coolant passed to the exchangers 56, 156. This provides a simple and inexpensive solution for maintaining the transmission's operating temperature.

What is claimed is:

1. A thermal management unit for a vehicle powertrain component, said thermal management unit comprising:
   a temperature controlled multi-port valve having a sensor adapted to sense a temperature of a lubricant used by the powertrain component, said valve having at least a first configuration during a first state whereby heated lubricant is passed to the powertrain component and a second configuration during a second state whereby cooled lubricant is passed to the powertrain component based on the sensed temperature; and
   a heat exchanger for heating the lubricant during the first state and cooling the lubricant during the second state, said heat exchanger having:
      a first port for inputting the lubricant from the component;
      a second port for outputting the heated or cooled lubricant to the sensor; and
      a third port connected to a first port of the valve and a fourth port connected to a coolant output of an engine.

2. The thermal management unit of claim 1, wherein during the first state, the heat exchanger inputs coolant output from the engine, uses the heat of the coolant to heat the lubricant, and outputs the coolant to the first port of the valve.

3. The thermal management unit of claim 1, wherein during the second state, the heat exchanger inputs coolant pumped from a pump through the first port of the valve, uses the coolant to cool the lubricant, and outputs the coolant to the coolant output of the engine.

4. The thermal management unit of claim 1, wherein in the first configuration, the first port of the valve inputs heated coolant output from the engine and passed through the exchanger and outputs the coolant via a second port to an input of a pump that provides the coolant to the engine.

5. The thermal management unit of claim 1, wherein in the second configuration, a second port of the valve inputs pumped coolant output from a pump used to provide the coolant to the engine and the first port outputs the coolant pumped from the pump to the heat exchanger, which uses the coolant to cool the lubricant.

6. An engine cooling system comprising:
a radiator;
a pump adapted to input engine coolant from the radiator and to pump the coolant to an engine; and
a thermal management unit for managing the temperature of a vehicle powertrain component, said thermal management unit comprising:
  a temperature controlled multi-port valve having a sensor adapted to sense a temperature of a lubricant used by the powertrain component, said valve having at least a first configuration during a first state whereby heated lubricant is passed to the powertrain component and a second configuration during a second state whereby cooled lubricant is passed to the powertrain component based on the sensed temperature; and
  a heat exchanger for heating the lubricant during the first state and cooling the lubricant during the second state, said heat exchanger having:
    a first port for inputting the lubricant from the component;
    a second port for outputting the heated or cooled lubricant to the sensor; and
    a third port connected to a first port of the valve and a fourth port connected to a coolant output of the engine.

7. The system of claim 6, wherein during the first state, the heat exchanger inputs coolant output from the engine, uses the heat of the coolant to heat the lubricant, and outputs the coolant to the first port of the valve and during the second state, the heat exchanger inputs coolant pumped from a pump through the first port of the valve, uses the coolant to cool the lubricant, and outputs the coolant to the coolant output of the engine.

8. The system of claim 6, wherein in the first configuration, the first port of the valve inputs heated coolant output from the engine and passed through the exchanger and outputs the coolant via a third port to an input of a pump that provides the coolant to the engine and in the second configuration, a second port of the valve inputs pumped coolant output from a pump used to provide the coolant to the engine and the first port outputs the coolant pumped from the pump through to the heat exchanger, which uses the coolant to cool the lubricant.

* * * * *